Aug. 15, 1944.   L. A. SHELDON   2,356,011
PACKING ARRANGEMENT
Original Filed April 2, 1940
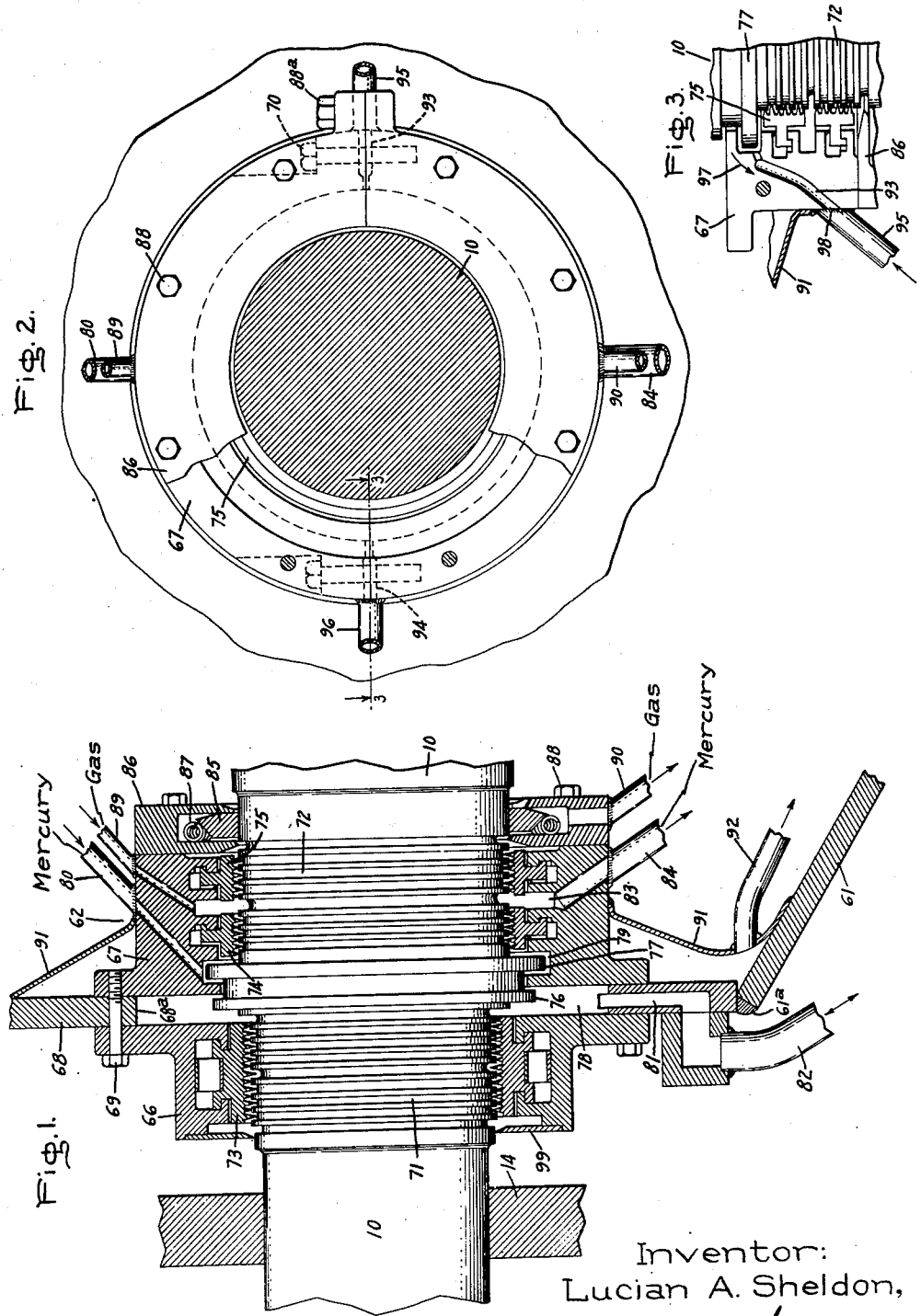
Inventor:
Lucian A. Sheldon,
by Harry E. Dunham
His Attorney.

Patented Aug. 15, 1944

2,356,011

UNITED STATES PATENT OFFICE 2,356,011

PACKING ARRANGEMENT

Lucian A. Sheldon, Schenectady, N. Y., assignor to General Electric Company, a corporation of New York Original application April 2, 1940, Serial No. 327,381, now Patent No. 2,282,894, dated May 12, 1942. Divided and this application March 27, 1942, Serial No. 436,458

2 Claims. (Cl. 286—9)

This is a division of my application Serial No. 327,381, filed April 2, 1940, on Elastic fluid turbine and issued May 12, 1942, as Patent No. 2,282,894. The present invention relates to shaft packing arrangements such as are used for sealing a rotatable shaft to a stationary casing.

The object of my invention is to provide an improved construction of packing arrangements whereby a shaft may be effectively sealed to a casing through which the shaft projects.

For a consideration of what I believe to be novel and my invention, attention is directed to the following description and the claims appended thereto in connection with the accompanying drawing.

In the drawing Figs. 1 and 2 illustrate a packing arrangement according to my invention; and Fig. 3 is a view along line 3—3 of Fig. 2.

In the present example the packing arrangement is shown as a part of a mercury turbine having shaft 10 with a bucket wheel 14 secured thereto and disposed within a turbine shell having an end ring 68. The shaft 10 projects through an opening 68a of the ring 68. The packing arrangement for sealing the shaft 10 to the shell or casing ring 68 comprises a packing casing 62 which has a left-hand portion 66 and a right-hand portion 67 secured to opposite sides of the ring 68 by means of a plurality of bolts 69; the portion 66 is located inside the exhaust space of the turbine. The outer edge of the ring 68 is secured to the end wall 61 by a weld 61a. The casing as a whole is split along a horizontal plane through the center of rotation to form two halves joined together by means of a plurality of bolts 70. The shaft portion within the packing casing has two grooved sections, an inner section 71 adjacent the exhaust end of the turbine and within the packing casing portion 66 and an outer grooved portion 72 facing away from the exhaust end and within the casing portion 67. The grooved portion 71 is in cooperative relation with a toothed packing ring 73 suitably supported on the packing casing portion 66 and having teeth in cooperative relation with the grooved shaft portion 71. The outer grooved portion 72 is in cooperative relation with the teeth of two packing rings 74 and 75 supported on the packing casing portion 67. The shaft portion between the grooved section 71, 72 forms two impellers 76 and 77. The impeller 76 projects into a chamber 78 formed between the spaced casing portions 66 and 67 and the impeller 77 projects into a groove 79 of the packing casing. In a preferred embodiment the impeller 77 and the groove 79 have hardened surfaces which may be formed by hardened metal inserts or covers. The groove 79 is connected through a channel in the packing casing to a conduit 80 for receiving mercury liquid during operation. The liquid thus supplied to the groove 79 forms a liquid seal between the groove and the impeller 77. Part of the liquid continuously supplied during operation to the groove 79 is discharged therefrom towards the impeller 76 which acts as a guide and throws the liquid outward in the chamber 78. The liquid is discharged from said chamber through a channel 81 in the ring 68 and a conduit 82 connected to the channel. Part of the liquid contained in the groove 79 flows along the labyrinth packing 74 towards a groove 83 formed by the casing portion 67 between the labyrinth packing rings 74, 75. The groove 83 is connected to a discharge conduit 84. The outer end of the packing arrangement is further sealed by means of a packing ring such as a carbon ring 85 biased towards an end plate 86 and towards the shaft 10 by means of a helical spring 87. The end ring 86 is secured to the casing portion 67 by a plurality of bolts 88. The end ring 86 is made up of two halves joined and secured together by bolts 88a.

During starting of the turbine a considerable amount of mercury is needed to produce a liquid seal between the shaft and the packing casing. For this reason a great amount of liquid is forced into the chamber 78 through the conduit or pipe 82 to fill the space 78 between the inner and outer grooved shaft portions 71 and 72. As soon as the shaft has reached approximately half speed the mercury liquid is supplied through the conduit 80 to the groove 79 to form a rotary liquid seal whereupon the supply through the conduit 82 is disconnected and said conduit becomes a discharge or drain conduit.

With the provision of the outer grooved shaft section 72 and the labyrinth packing rings 74, 75 small particles of mercury leaking along the shaft are prevented from leaking into the atmosphere. In a preferred embodiment non-oxidizing gas, such as nitrogen, is admitted into the space 83 between the outer labyrinth rings through a pipe 89 at a pressure slightly below that of the atmosphere. This gas is discharged from the space between the packing ring 75 and the carbon ring 85 through a pipe 90. The supply of gas maintains the pressure between the outer labyrinth and the carbon ring to slightly below atmosphere, thus permitting always a slight inflow or leakage of air from the atmosphere into the space 83 to prevent any leakage of mercury into the atmosphere. Leakage of fluid along the adjacent surfaces of the casing portion 66 and the ring 68 flows into the exhaust space of the turbine. Leakage of fluid along the adjacent surfaces of the ring 68 and the casing portion 67 is prevented from flowing into the atmosphere by the provision of a sealing strip 91 secured between the end wall 61 and the casing portion 67. Leakage of fluid into the space formed by the sealing strip 91 and the adjacent elements is drained through a pipe 92.

The arrangement also includes means to reduce leakage of fluid, particularly air from the atmosphere into the turbine, along the joint formed between the lower and upper halves of the casing portion 67. To this end the joining surfaces of the lower and upper halves of these casing portions are provided with grooves 93 and 94 extending from the outer surface of the casing portion 67 towards the annular groove 79. The grooves 93 and 94 in the present instance are formed in both the lower and upper halves of the casing portion 67. The outer ends of the grooves communicate with pipes 95 and 96 respectively through which a continuous stream of mercury liquid is conducted to the grooves 93 and 94 respectively during operation. With this arrangement mercury, particularly mercury vapor, leaking along a joint formed between the lower and upper halves of the casing portion 67 in the direction of the arrow 97 indicated in Fig. 3 is collected or condensed in the grooves 93, 94 and thereby prevented from reaching the outer end of the casing portion 67 and air from the atmosphere is prevented from leaking into the sealing arrangement. The pipes 95 and 96 are connected to the grooves 93 and 94 respectively by means of welds 98 which extend along the entire end portions of the joined casing portions 67 (Fig. 3). A sealing ring 99 is secured to the left-hand end portion of the packing casing and has an inner edge in close proximity to the shaft to prevent mercury liquid particles from being thrown from the packing towards the last stage bucket wheel.

Thus, a packing according to my invention includes a casing forming three axially spaced annular grooves or chambers, a first groove 78, a second groove 79, and a third groove 83. The second or intermediate groove 79 accommodates an impeller 77 on the shaft. Sealing liquid supplied to the groove 79 during operation forms an annular liquid seal between the impeller 77 and the surface of the groove 79. The first groove or chamber 78 accommodates an impeller or deflector 76 to throw outward mercury liquid discharged from the groove 79 during operation, such liquid being drained from the groove or chamber 78 through a discharge conduit 82. The conduit 82 being substantially wider than the conduit 80 acts as a supply conduit for mercury liquid during the starting operation.

The third groove 83 located near the outer or atmospheric end of the packing and between the two outer labyrinth packing rings 74, 75 acts as a chamber for receiving an inert gas during operation from a supply pipe 89. Such gas, as pointed out above, is preferably supplied at a pressure slightly below that of the atmosphere whereby a small amount of air may be drawn into the packing casing along the carbon packing ring 85 and the discharge of mercury liquid from the packing casing to the atmosphere is substantially entirely prevented.

The packing casing is made of two halves joined together along a horizontal plane through the axis of the shaft and the joint surfaces have sealing grooves for receiving mercury liquid during operation to prevent the leakage of vapor from the packing along the casing joint.

What I claim as new and desire to secure by Letters Patent of the United States, is:

1. Packing arrangement comprising a rotary shaft having axially spaced grooved portions, an impeller on the shaft between the grooved portions, a packing casing having a groove into which the impeller projects, packing rings supported on the casing in cooperative relation with the grooved shaft portions, means for normally supplying liquid to the groove to form a liquid seal between the impeller and the casing, the packing casing forming an annular chamber, adjacent the groove, and means including a conduit connected to the chamber normally to drain liquid therefrom and during the starting period to supply liquid to the chamber the shaft having a smooth cylindrical surface between the chamber and said groove to facilitate the supply of liquid to the chamber during the starting period.

2. Shaft packing arrangement comprising a shaft having an impeller, a packing casing having two halves joined together and forming an annular groove accommodating the impeller, the joined surfaces of the two casing halves forming a sealing groove extending from the annular groove across the entire width of the joint, and means including a pipe connected to the outer end of the sealing groove for continuously supplying sealing liquid to the annular groove to form a liquid seal across the joint of the packing casing and between the annular groove and the impeller to prevent leakage of fluid axially along the joint and the inner surface of the casing.

LUCIAN A. SHELDON.